US010403966B2

(12) United States Patent
Su et al.

(10) Patent No.: US 10,403,966 B2
(45) Date of Patent: Sep. 3, 2019

(54) COMMUNICATION DEVICE AND ANTENNA ASSEMBLY THEREOF

(71) Applicant: KING SLIDE TECHNOLOGY CO., LTD., Kaohsiung (TW)

(72) Inventors: Hsin-Cheng Su, Kaohsiung (TW); Chun-Ta Liu, Kaohsiung (TW); Shu-Chen Lin, Kaohsiung (TW)

(73) Assignee: KING SLIDE TECHNOLOGY CO., LTD., Kaohsiung (TW)

( * ) Notice: Subject to any disclaimer, the term of this patent is extended or adjusted under 35 U.S.C. 154(b) by 193 days.

(21) Appl. No.: 15/344,604

(22) Filed: Nov. 7, 2016

(65) Prior Publication Data
US 2017/0365912 A1 Dec. 21, 2017

(30) Foreign Application Priority Data
Jun. 20, 2016 (TW) .............................. 105119383 A

(51) Int. Cl.
*H01Q 1/24* (2006.01)
*H01Q 1/48* (2006.01)
*H01Q 1/50* (2006.01)
*H01Q 1/38* (2006.01)
*G06F 1/16* (2006.01)
G06F 1/20 (2006.01)
H01Q 9/42 (2006.01)
H01Q 21/28 (2006.01)
H04B 1/3888 (2015.01)

(52) U.S. Cl.
CPC .......... *H01Q 1/243* (2013.01); *G06F 1/1626* (2013.01); *G06F 1/1658* (2013.01); *H01Q 1/38* (2013.01); *H01Q 1/48* (2013.01); *H01Q 1/50* (2013.01); *G06F 1/203* (2013.01); *H01Q 9/42* (2013.01); *H01Q 21/28* (2013.01); *H04B 1/3888* (2013.01)

(58) Field of Classification Search
CPC ............ H01Q 1/243; H01Q 1/38; H01Q 1/48; H01Q 1/50; H01Q 9/42; H01Q 21/28; G06F 1/203; G06F 1/1626; G06F 1/1658; H04B 1/3888
USPC ........................................................ 343/702
See application file for complete search history.

(56) References Cited

U.S. PATENT DOCUMENTS 8,054,231 B2 11/2011 Ahn
2003/0052824 A1* 3/2003 Ollikainen ............. H01Q 1/243
343/700 MS (Continued)

FOREIGN PATENT DOCUMENTS

JP S6440910 A 2/1989
JP S6440910 U 3/1989

(Continued)

*Primary Examiner* — Hai V Tran
*Assistant Examiner* — Bamidele A Jegede
(74) *Attorney, Agent, or Firm* — Winston Hsu

(57) ABSTRACT

A communication device includes a main body, a mother board, a housing and a first antenna. The main body is formed with a rim. The mother board is arranged at a first side of the main body. The housing is mounted on the main body and configured to cover the mother board. An orthogonal projection of the housing onto the main body defines a covering range. The first antenna is electrically connected to the mother board and arranged along the rim of the main body. Wherein, at least one portion of the first antenna is located outside the covering range of the housing.

18 Claims, 7 Drawing Sheets

(56) References Cited

U.S. PATENT DOCUMENTS

| | | |
|---|---|---|
| 2007/0241971 A1 | 10/2007 | Tsujimura |
| 2008/0316121 A1 | 12/2008 | Hobson |
| 2011/0304511 A1 | 12/2011 | Fan |
| 2012/0235879 A1 | 9/2012 | Eder |
| 2013/0069836 A1 | 3/2013 | Bungo |
| 2014/0031093 A1* | 1/2014 | Song .................. H04B 1/3888 455/575.1 |
| 2014/0210675 A1* | 7/2014 | Hwang .................. H01Q 1/44 343/702 |
| 2014/0253477 A1* | 9/2014 | Shim .................. G06F 3/0487 345/173 |
| 2015/0109170 A1* | 4/2015 | Kang .................. G06F 1/182 343/702 |
| 2015/0241935 A1* | 8/2015 | Jang .................. G06F 1/203 361/679.54 |
| 2015/0245513 A1* | 8/2015 | Moon .................. G06F 1/20 361/679.01 |
| 2015/0364812 A1* | 12/2015 | Su .................. H01Q 1/243 343/702 |
| 2015/0372372 A1* | 12/2015 | Lee .................. H01Q 1/243 343/702 |
| 2016/0088130 A1* | 3/2016 | Jung .................. G06F 1/1626 455/575.1 |
| 2016/0111771 A1* | 4/2016 | Su .................. H01Q 1/243 343/702 |
| 2016/0164168 A1* | 6/2016 | Choi .................. H01Q 1/48 343/702 |

FOREIGN PATENT DOCUMENTS

| | | |
|---|---|---|
| JP | H9246832 A | 9/1997 |
| JP | 200713596 A | 1/2007 |
| JP | 2008159636 A | 7/2008 |
| JP | 200921932 A | 1/2009 |
| JP | 2012525065 A | 10/2012 |
| JP | 2013175842 A | 9/2013 |

* cited by examiner

US 10,403,966 B2

COMMUNICATION DEVICE AND ANTENNA ASSEMBLY THEREOF

BACKGROUND OF THE INVENTION

1. Field of the Invention

The present invention relates to a communication device, and more particularly, to a communication device with a portion of an antenna not covered by a housing.

2. Description of the Prior Art

During product development processes of conventional communication devices, such as mobile communication products, plastic housings are mainly used by manufacturers due to cost concerns, in order to maintain basic radiation characteristics of an antenna. However, a trend of metal housing is currently brought by Apple iPhones and Macbooks. Since the metal housing has light weight, good heat dissipation, high strength, high impact resistance, good looking, anti-electromagnetic and recyclable characteristics, the metal housing is getting more and more popular. Therefore, the metal housings are mainly used in development of new generations of the mobile communication products. For example, U.S. Pat. No. 8,054,231 B2 disclosed by Ahn et al. teaches a metal case having a slot, which can be used as a slot antenna of a mobile device.

However, consumer base of the communication market is large. It is important to design communication devices with different antenna arrangements to satisfy requirements of specific consumer groups.

SUMMARY OF THE INVENTION

The present invention relates to a communication device, and more particularly, to a communication device with a portion of an antenna not covered by a housing.

According to an embodiment of the present invention, a communication device comprises a main body, a mother board, a housing and a first antenna. The main body is formed with a rim. The mother board is arranged at a first side of the main body. The housing is mounted on the main body and configured to cover the mother board. An orthogonal projection of the housing onto the main body defines a covering range. The first antenna is electrically connected to the mother board and arranged along the rim of the main body. Wherein, at least one portion of the first antenna is located outside the covering range of the housing.

Preferably, the mother board is located between the main body and the housing.

Preferably, the main body is made of a non-metallic material.

Preferably, the rim of the main body comprises a plurality of rim parts. The mother board is correspondingly arranged between the rim parts.

Preferably, the first antenna comprises a feed terminal electrically connected to the mother board, and a portion of the first antenna is attached to one of the rim parts of the main body.

Preferably, the housing comprises a plurality of side parts. The at least one portion of the first antenna is extended beyond one of the side parts of the housing to be located outside the covering range of the housing.

Preferably, the communication device further comprises a frame mounted to the main body. Wherein, the main body is located between the frame and the housing. The frame comprises a plurality of frame parts defining a space for accommodating the main body. The at least one portion of the first antenna is located between the frame and the main body.

Preferably, an outer dimension of the frame is greater than an outer dimension of the main body, and an outer dimension of the housing is smaller than or equal to the outer dimension of the main body.

Preferably, the frame is made of a non-metallic material.

Preferably, the at least one portion of the first antenna comprises one of a first radiation part and a second radiation part. The first radiation part is configured to transmit or receive a high frequency signal. The second radiation part is configured to transmit or receive a low frequency signal.

Preferably, the second radiation part comprises a first conductor and a second conductor coupled to the first conductor. The second conductor has a first slit and a second slit. The first slit is arranged along a longitudinal direction of the second conductor. The second slit is turned relative to the first slit and communicated with the first slit. A gap is formed between the first radiation part and the second radiation part. The first radiation part has a third slit arranged along a longitudinal direction of the first radiation part.

Preferably, a length of the first radiation part is smaller than a length of the second radiation part.

Preferably, a portion of the first antenna is located adjacent to a corner of the mother board.

Preferably, the communication device further comprises an auxiliary element attached to a second side of the main body. Wherein, the auxiliary element is made of a metal material and comprises a plurality of side parts corresponding to the rim parts of the main body.

Preferably, the housing is a back cover. The housing is made of a metal or plastic material. When the housing is made of a metal material, the housing functions as a ground of the mother board.

Preferably, the communication device further comprises a second antenna and a third antenna. Wherein, each of the second antenna and the third antenna comprises a feed terminal electrically connected to the mother board. A portion of each of the second antenna and the third antenna is extended beyond the housing to be located outside the covering range of the housing.

Preferably, portions of the second antenna and the third antenna are respectively located adjacent to another two corners of the mother board.

Preferably, the communication device further comprises a battery and a display module electrically connected to the mother board.

According to another embodiment of the present invention, an antenna assembly for a communication device comprises a mother board and an antenna. The antenna comprises a feed terminal electrically connected to the mother board. The antenna is arranged along a side part of the mother board. Wherein, the mother board is covered by a back cover of the communication device, and a portion of the antenna is not covered by the back cover.

Preferably, the housing is made of a metal material.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
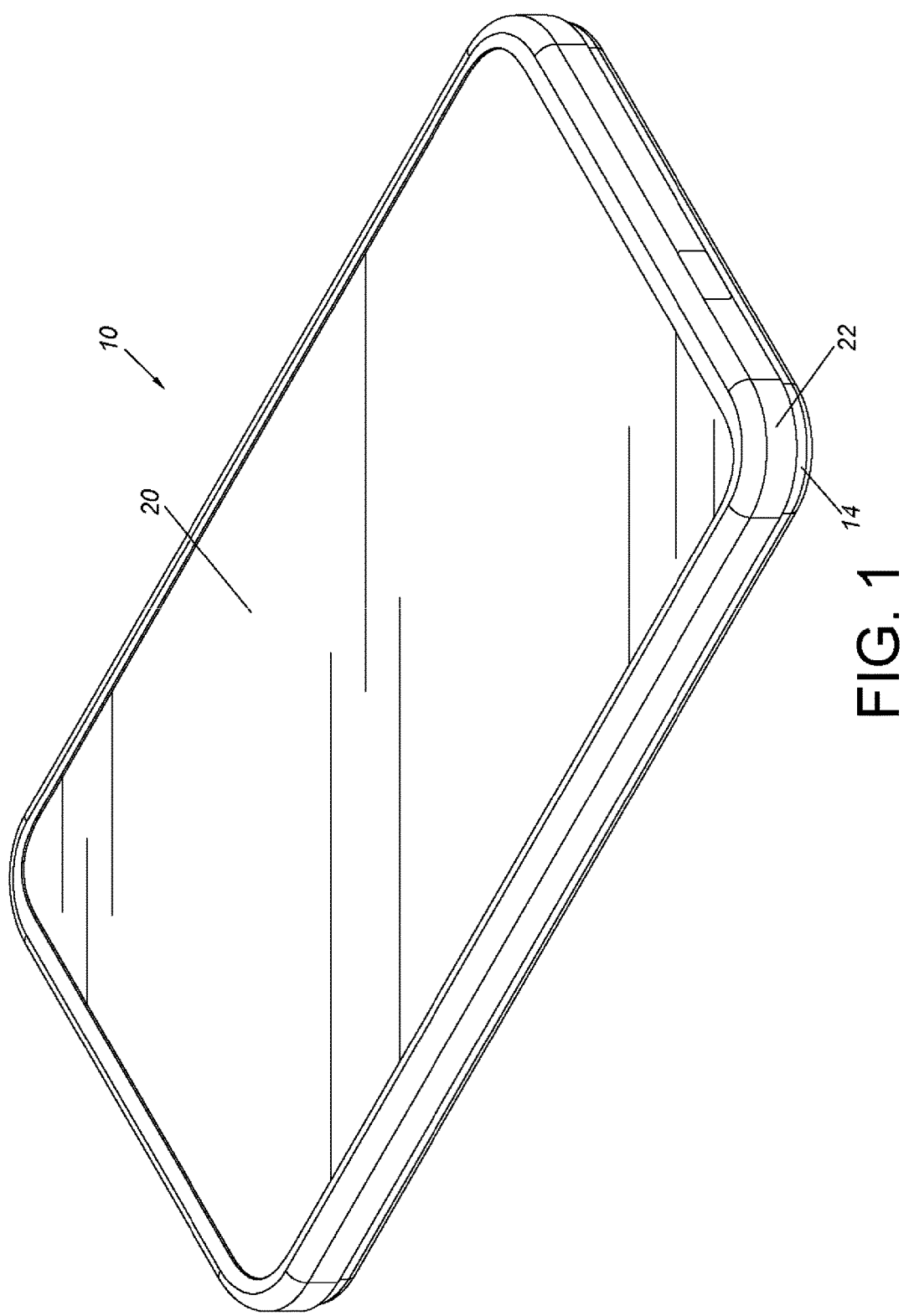
FIG. 1 is a diagram showing a communication device according to an embodiment of the present invention.
Figure 2:
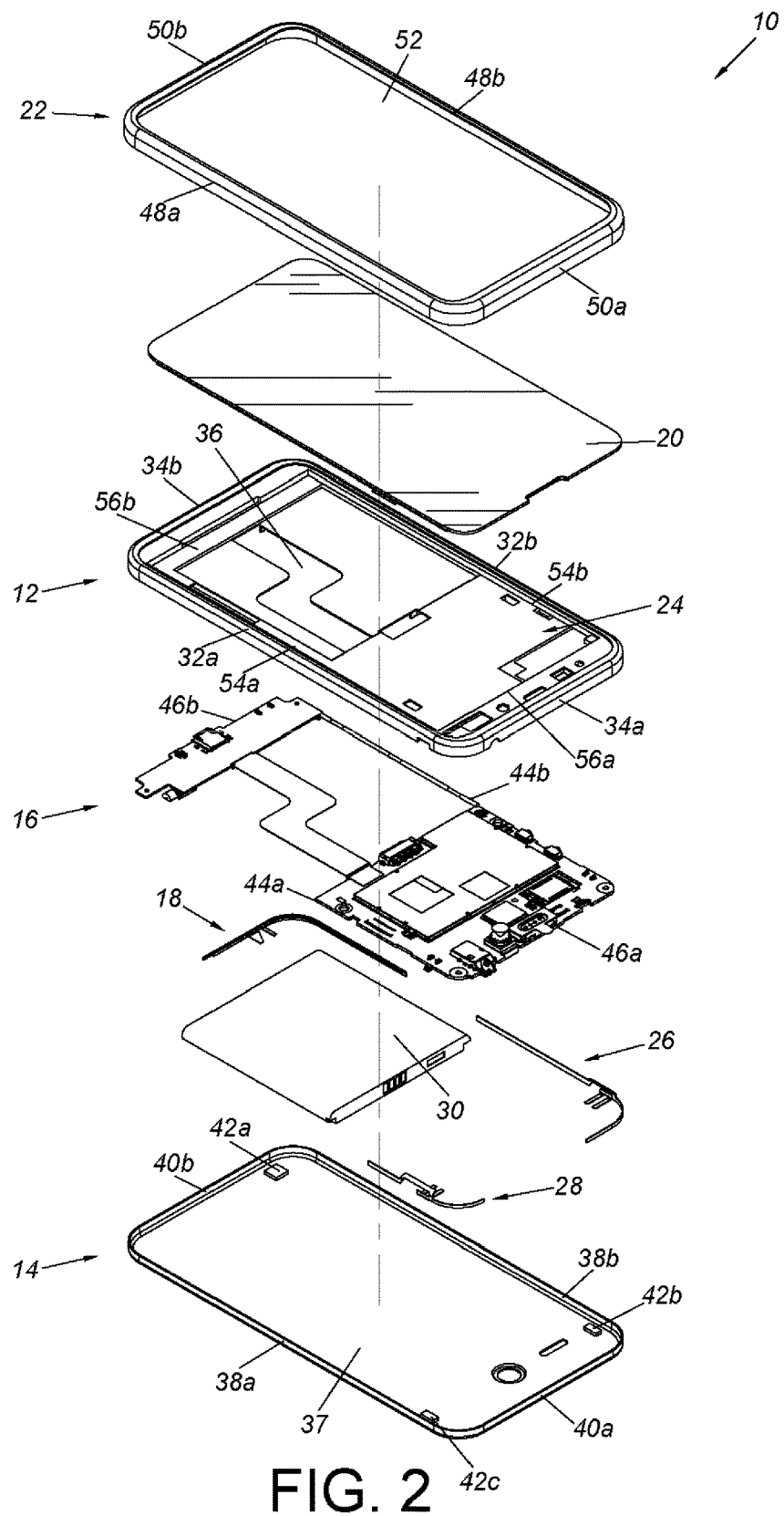
FIG. 2 is an exploded view of the communication device according to an embodiment of the present invention.

As shown in FIG. 1 and FIG. 2, a communication device 10 of the present invention comprises a main body 12, a housing 14, a mother board 16, a first antenna 18 and a display module 20. Preferably, the communication device 10 further comprises a frame 22, an auxiliary element 24, a second antenna 26, a third antenna 28 and a battery 30.

The main body 12 is made of a non-metallic material, such as plastic. A rim is formed on the main body 12. The rim comprises a plurality of rim parts. In the present embodiment, the rim comprises a pair of first rim part 32a, 32b connected to a pair of second rim part 34a, 34b. A space 36 is defined by the rim parts 32a, 32b, 34a, 34b. A length of the first rim part 32a (or 32b) is greater than a length of the second rim part 34a (or 34b).

The housing 14 can be mounted to the main body 12, and is configured to cover most of the mother board 16 and the battery 30 for protecting related electronic components of the communication device 10. The housing 14 can be made of a metal material or a non-metallic material (such as plastic). In the present embodiment, the housing 14 is a back cover, and the housing 14 is made of a metal material. The housing 14 can function as a ground of the mother board 16. Furthermore, the housing 14 comprises an inner surface 37 and a plurality of side parts located around the inner surface 37. For example, the side parts are a pair of first side parts 38a, 38b and a pair of second side parts 40a, 40b. Wherein, the inner surface 37 can have at least one ground area. In the present embodiment, the inner surface 37 has ground areas 42a, 42b and 42c. The ground areas 42a, 42b and 42c are arranged at different positions.

The mother board 16 is correspondingly arranged in the space 36 defined by the rim parts 32a, 32b, 34a, 34b, and located on the first side of the main body 12. In particular, the mother board 16 comprises a plurality of side parts. For example, the mother board 16 comprises a pair of first side parts 44a, 44b and a pair of second side parts 46a, 46b. In the present embodiment, the mother board 16 is located between the main body 12 and the housing 14, and is completely covered by the housing 14.

The display module 20 is configured to display electronic information of the communication device 10, and the display module 20 can be a touch display module. Since the display module is well known to those skilled in the art, no further illustration is provided. In the present embodiment, the display module 20 is located between the main body 12 and the frame 22, and electrically connected to the mother board 16.

The frame 22 can be mounted to the main body 12, such that the main body 12 is located between the frame 22 and the housing 14. The frame 22 is a major exterior part of the communication device 10, and the frame 22 can be decorated by various surface treatments. Preferably, an outer dimension of the frame 22 is greater than an outer dimension of the main body 12, and an outer dimension of the housing 14 is smaller than or equal to the outer dimension of the main body 12. In particular, the frame 22 comprises a plurality of frame parts, such as a pair of first frame parts 48a, 48b and a pair of second frame parts 50a, 50b connected to each other. A space 52 is defined by the frame parts 48a, 48b, 50a, 50b for accommodating the main body 12 and the display module 20 therein. Preferably, the frame 22 is made of a non-metallic material, such as plastic.

The battery 30 is configured to provide electricity to the communication device 10. For example, the battery 30 is electrically connected to the mother board 16 for providing electricity.

The first antenna 18, the second antenna 26 and the third antenna 28 can be formed on the main body 12 as flexible printed circuit boards, or formed on the main body 12 by laser direct structuring, metal printing or metal stamping.

Figure 3:
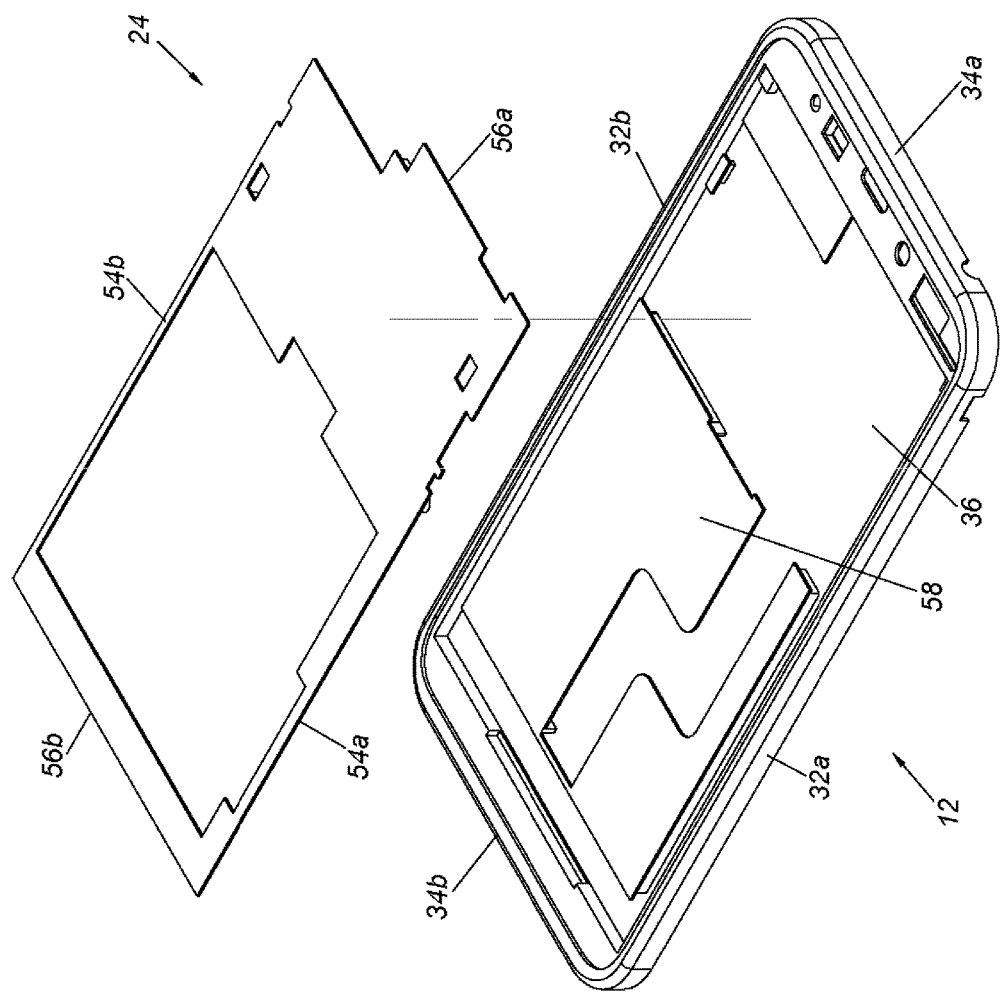
FIG. 3 is an exploded view of a main body and an auxiliary element of the communication device according to an embodiment of the present invention.

As shown in FIG. 2 and FIG. 3, the auxiliary element 24 is adjacent to the main body 12. Connection between the auxiliary element 24 and the main body 12 can be implemented by injection molding, ultrasonic welding or hot melting. Preferably, the auxiliary element 24 is attached to a second side of the main body 12 (different from the first side of the main body 12). Wherein, the auxiliary element 24 is made of a metal material. In particular, if the display module 20 comprises a metal shielding mask, the display module 20 can be electrically connected to the auxiliary element 24 through an elastic metal piece or other conductive material. The auxiliary element 24 comprises a plurality of side parts corresponding to the rim parts 32a, 32b, 34a, 34b of the main body 12. For example, the auxiliary element 24 comprises a pair of first side parts 54a, 54b and a pair of second side parts 56a, 56b. Preferably, the main body 12 comprises a separating member 58 configured to separate the auxiliary element 24 from the mother board 16. Wherein, since the auxiliary element 24 is made of a metal material, the auxiliary element 24 is capable of improving structure strength of the main body 12. The auxiliary element 24 can also help the mother board to dissipate heat. In addition, when the housing 14 is made of a plastic material, the auxiliary element 24 can function as a ground of the mother board 16. For example, the mother board 16 can be electrically connected to the auxiliary element 24 through an elastic metal piece or other conductive material. On the other hand, both the housing 14 and the auxiliary element 24 can be made of the metal material for being utilized as grounds of the mother board 16. In addition, the housing 14, the mother board 16 and one of the antennas 18, 26, 28 can constitute an antenna assembly.

Figure 4:
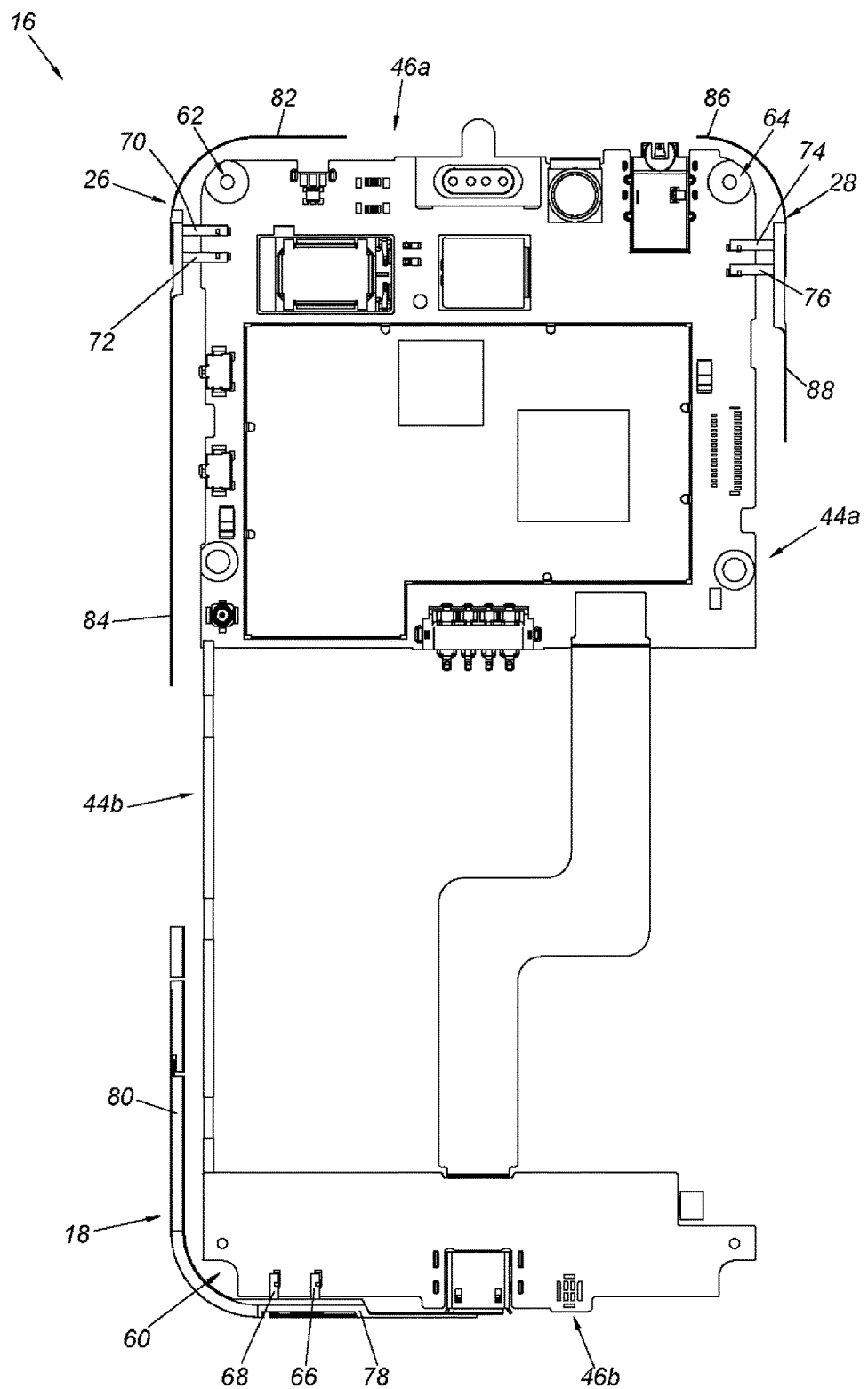
FIG. 4 is a diagram showing arrangement of a mother board and antennas according to an embodiment of the present invention.

As shown in FIG. 4, a length of the first side part 44b of the mother board 16 is greater than a length of the second side part 46a (or 46b) of the motherboard 16. In addition, there are corners between the side parts 44a, 44b, 46a, 46b of the motherboard 16. For example, a first corner 60, a second corner 62 and a third corner 64 are formed at turning positions of the side parts 44a, 44b, 46a, 46b of the mother board 16. On the other hand, the first antenna 18, the second antenna 26 and the third antenna 28 can be respectively located adjacent to the first corner 60, the second corner 62 and the third corner 64. In other words, a portion of each antenna is located adjacent to a corresponding corner of the mother board 16. Wherein, the third antenna 28 can be a GPS (Global Positioning System) antenna or WIFI antenna.

Moreover, each of the first antenna 18, the second antenna 26 and the third antenna 28 has a feed terminal and a ground terminal. In the present embodiment, the first antenna 18 has a feed terminal 66 and a ground terminal 68 respectively electrically connected to the mother board 16; the second antenna 26 has a feed terminal 70 and a ground terminal 72 respectively electrically connected to the mother board 16; and the third antenna 28 has a feed terminal 74 and a ground terminal 76 respectively electrically connected to the mother board 16.

The antennas can comprise a plurality of radiation parts. For example, the first antenna 18 has a first radiation part 78 and a second radiation part 80. The first radiation part 78 is configured to transmit or receive a high frequency signal. The second radiation part 80 is configured to transmit or receive a low frequency signal. Wherein, the second radiation part 80 of the first antenna 18 corresponds to the first side part 44*b* of the mother board 16, and the first radiation part 78 of the first antenna 18 corresponds to the second side part 46*b* of the motherboard 16. A length of the first radiation part 78 is smaller than a length of the second radiation part 80. Similarly, the second antenna 26 has a first radiation part 82 and a second radiation part 84. The first radiation part 82 is configured to transmit or receive a high frequency signal. The second radiation part 84 is configured to transmit or receive a low frequency signal. Wherein, the second radiation part 84 of the second antenna 26 corresponds to the first side part 44*b* of the mother board 16, and the first radiation part 82 of the second antenna 26 corresponds to the second side part 46*a* of the mother board 16. A length of the first radiation part 82 is smaller than a length of the second radiation part 84.

In addition, the third antenna 28 has a first radiation part 86 and a second radiation part 88. Wherein, the second radiation part 88 of the third antenna 28 corresponds to the first side part 44*a* of the mother board 16, and the first radiation part 86 of the third antenna 28 corresponds to the second side part 46*a* of the motherboard 16.

Figure 5:
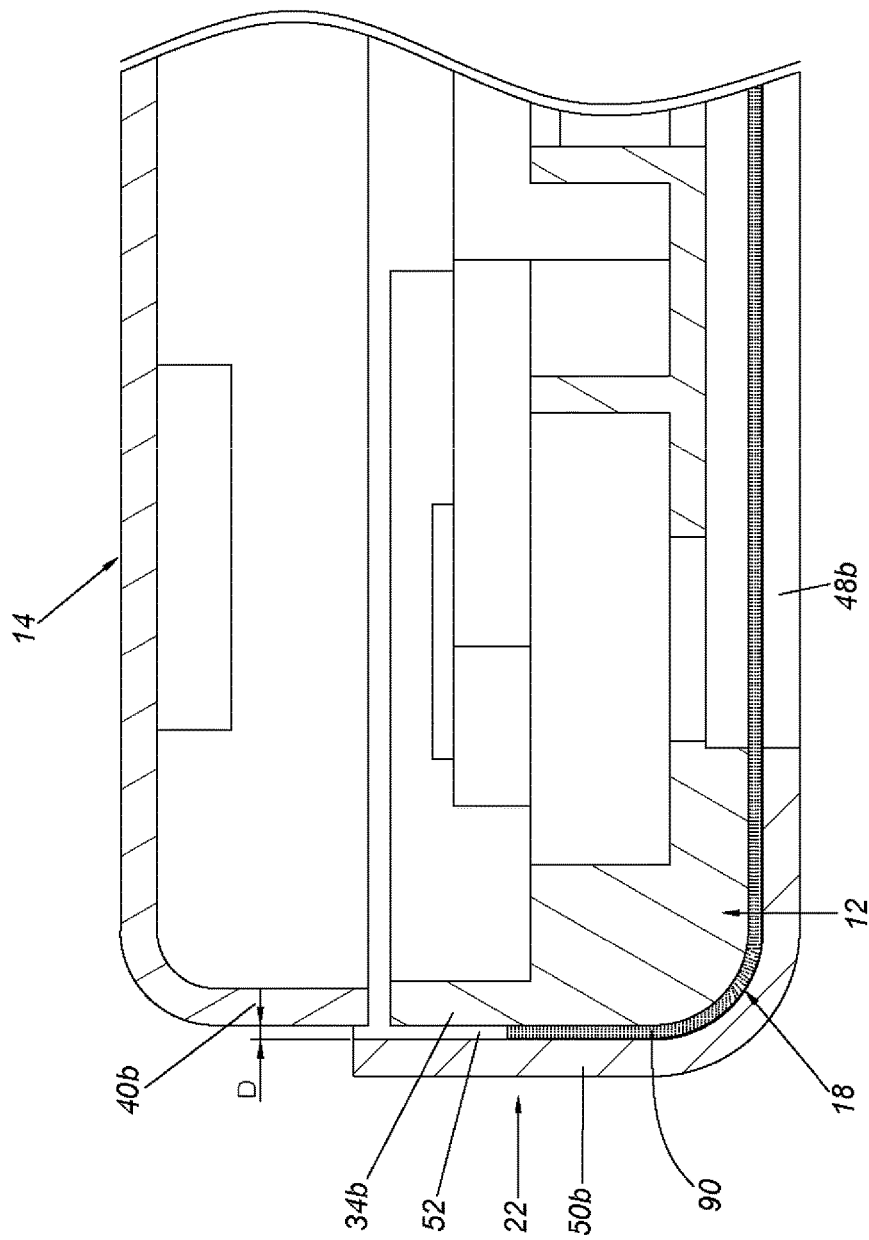
FIG. 5 is a partial view of an assembly of a housing, the main body and a frame according to an embodiment of the present invention, for illustrating a portion of the antenna being extended beyond a side part of the housing.

As shown in FIG. 5, the housing 14 can be mounted to the main body 12 by fastening or screwing. On the other hand, the frame 22 can be mounted to the main body 12 by fastening, ultrasonic welding or hot melting. The mounting methods between the housing 14, the main body 12 and the frame 22 are not limited thereto. In addition, since the outer dimension of the frame 22 is greater than the outer dimension of the main body 12, the space 52 of the frame 22 is capable of accommodating the main body 12. Moreover, since the outer dimension of the housing 14 is smaller than or equal to the outer dimension of the main body 12, the frame 22 is also capable of accommodating a portion of the housing 14 (please refer FIG. 1).

Portions of the first antenna 18, the second antenna 26 and the third antenna 28 are arranged adjacent to the main body 12. For simplification, only the first antenna 18 is illustrated. A portion 90 of the first antenna 18 is adjacent to the main body 12. In the present embodiment, the portion 90 of the first antenna 18 is attached to one of the rim parts of the main body 12, such as attaching to the second rim part 34*b*. An orthogonal projection of the housing 14 onto the main body 12 defines a covering range. Preferably, the portion 90 of the first antenna 18 (or the whole first antenna 18) is located outside the covering range of the housing 14. As shown in FIG. 5, the portion 90 of the first antenna 18 is located in an area outside the covering range of the housing 14. Briefly, the portion 90 of the first antenna 18 is not covered by the housing 14. In the present embodiment, the portion 90 of the first antenna 18 is extended a distance D beyond a side part of the housing 14 (such as the second side part 40*b*). Preferably, the portion 90 of the first antenna 18 is located between the second frame part 50*b* of the frame 22 and the second rim part 34*b* of the main body 12. The portion 90 of the first antenna 18 can be the first radiation part 78 or the second radiation part 80 of the first antenna 18. In the present embodiment, the portion 90 of the first antenna 18 is the first radiation part 78 of the first antenna 18, but the present invention is not limited thereto. As such, a main radiation part of the first antenna 18 is located outside the covering range of the housing 14.

Similarly, a portion of each of the second antenna 26 and the third antenna 28 (such as a first radiation part or a second radiation part) is also extended a distance beyond the housing 14 to be located outside the covering range of the housing 14, such that a main radiation part of each of the second antenna 26 and the third antenna 28 is located outside the covering range of the housing 14. For simplification, no further illustration is provided.

Figure 6:
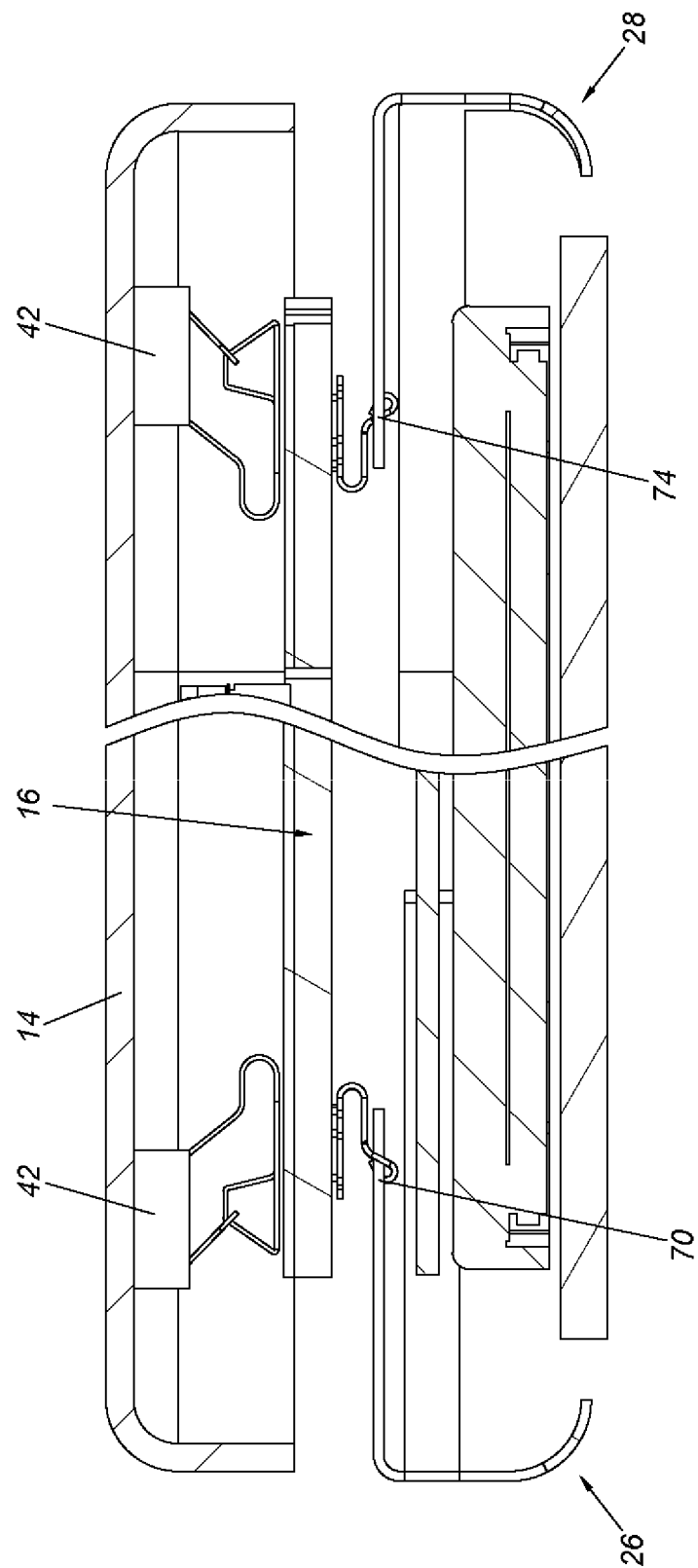
FIG. 6 is a diagram showing the mother board of the communication device electrically connected to the housing and the antenna according to an embodiment of the present invention.

In FIG. 6, only the second antenna 26 and the third antenna 28 are illustrated. The feed terminal 70 of the second antenna 26 and the feed terminal 74 of the third antenna 28 can be respectively electrically connected to the mother board 16 through elastic metal pieces or other conductive material. Similarly, the ground terminal 72 of the second antenna 26 (not shown in FIG. 6) and the ground terminal 76 of the third antenna 28 (not shown in FIG. 6) can be respectively electrically connected to the mother board 16 through elastic metal pieces or other conductive material. On the other hand, the ground terminals 68, 72, 76 of the first antenna 18, the second antenna 26 and the third antenna 28 can also be respectively electrically connected to the corresponding ground areas 42*a*, 42*b*, and 42*c* of the housing 14 by the mother board 16 through an elastic metal piece or other conductive material.

Figure 7:
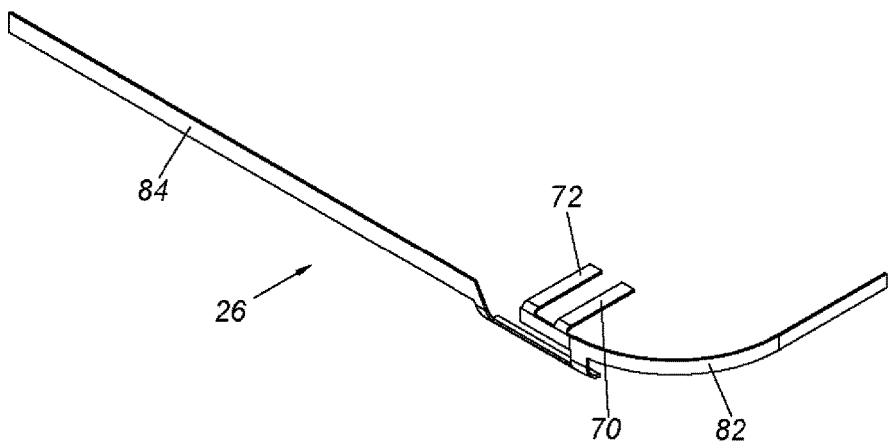
FIG. 7 is a diagram showing one of the antennas according to an embodiment of the present invention.

As shown in FIG. 7, the second antenna 26 comprises the first radiation part 82 and the second radiation part 84. The feed terminal 70 and the ground terminal 72 are located between the first radiation part 82 and the second radiation part 84.

Figure 8:
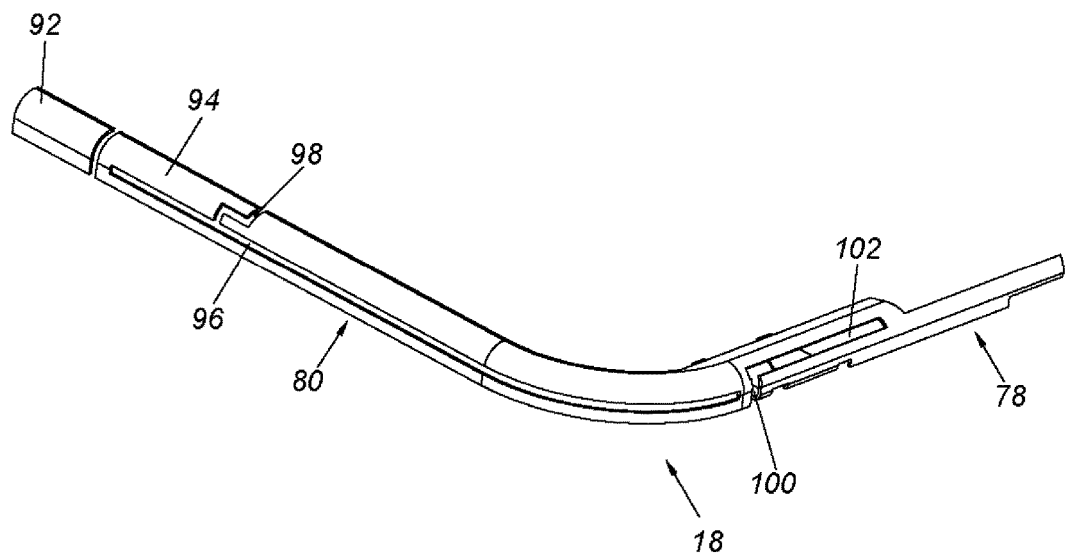
FIG. 8 is a diagram showing another one of the antennas according to an embodiment of the present invention.

As shown in FIG. 8, the second radiation part 80 of the first antenna 18 comprises a first conductor 92 and a second conductor 94 coupled to the first conductor 92. The second conductor 94 has a first slit 96 and a second slit 98. Wherein, the first slit 96 is arranged along a longitudinal direction of the second conductor 80, and the second slit 98 is turned relative to the first slit 96 and communicated with the first slit 96. A gap 100 is formed between the first radiation part 78 and the second radiation part 80 of the first antenna 18, and the first radiation part 78 has a third slit 102 arranged along a longitudinal direction of the first radiation part 78. According to the above arrangement, efficiency of signal transmission and reception of the first antenna 18 can be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device, comprising:
   a main body formed with a rim;
   a mother board arranged at a first side of the main body;
   a housing mounted on the main body and configured to cover the mother board, the housing comprising a plurality of side parts, an orthogonal projection of the housing onto the main body defining a covering range;
   a frame mounted to the main body, wherein the main body is located between the frame and the housing, the frame comprises a plurality of frame parts defining a space for accommodating the main body; and
   a first antenna electrically connected to the mother board and arranged along the rim of the main body, wherein the first antenna comprises a first radiation part and a second radiation part, the first radiation part and the second radiation part of the first antenna are connected with each other to form an L-shaped structure, at least one of the first radiation part and the second radiation part of the first antenna is extended a distance beyond one of the side parts of the housing, such that the at least one of the first radiation part and the second radiation part of the first antenna is located outside the covering range of the housing and exposed to an outside of the communication device, and the at least one of the first radiation part and the second radiation part of the first antenna is located between the rim of the main body and one of the frame parts of the frame.

2. The communication device of claim 1, wherein the mother board is located between the main body and the housing.

3. The communication device of claim 1, wherein the main body is made of a non-metallic material.

4. The communication device of claim 1, wherein the rim of the main body comprises a plurality of rim parts, the mother board is correspondingly arranged between the rim parts.

5. The communication device of claim 4, wherein the first antenna comprises a feed terminal electrically connected to the mother board, and a portion of the first antenna is attached to one of the rim parts of the main body.

6. The communication device of claim 4, further comprising an auxiliary element attached to a second side of the main body, wherein the auxiliary element is made of a metal material and comprises a plurality of side parts corresponding to the rim parts of the main body.

7. The communication device of claim 1, wherein an outer dimension of the frame is greater than an outer dimension of the main body, and an outer dimension of the housing is smaller than or equal to the outer dimension of the main body.

8. The communication device of claim 1, wherein the frame is made of a non-metallic material.

9. The communication device of claim 1, wherein the first radiation part is configured to transmit or receive a high frequency signal, and the second radiation part is configured to transmit or receive a low frequency signal.

10. The communication device of claim 9, wherein the second radiation part comprises a first conductor and a second conductor coupled to the first conductor, the second conductor has a first slit and a second slit, the first slit is arranged along a longitudinal direction of the second conductor, the second slit is turned relative to the first slit and communicated with the first slit, a gap is formed between the first radiation part and the second radiation part, the first radiation part has a third slit arranged along a longitudinal direction of the first radiation part.

11. The communication device of claim 9, wherein a length of the first radiation part is smaller than a length of the second radiation part.

12. The communication device of claim 1, wherein a portion of the first antenna is located adjacent to a corner of the mother board.

13. The communication device of claim 12, further comprising a second antenna and a third antenna, wherein each of the second antenna and the third antenna comprises a feed terminal electrically connected to the mother board, a portion of each of the second antenna and the third antenna is extended beyond the housing to be located outside the covering range of the housing.

14. The communication device of claim 13, wherein portions of the second antenna and the third antenna are respectively located adjacent to another two corners of the mother board.

15. The communication device of claim 1, wherein the housing is a back cover, the housing is made of a metal or plastic material, when the housing is made of a metal material, the housing functions as a ground of the mother board.

16. The communication device of claim 1, further comprising a battery and a display module electrically connected to the mother board.

17. An antenna assembly for a communication device, comprising:
   a mother board; and
   an antenna comprising a feed terminal electrically connected to the mother board, the antenna being arranged along a side part of the mother board;
   wherein the mother board is covered by a back cover of the communication device, and the back cover comprises a plurality of side parts;
   wherein the back cover is mounted on a main body with a rim, a frame is mounted to the main body, the main body is located between the frame and the back cover, the frame comprises a plurality of frame parts defining a space for accommodating the main body, the first antenna comprises a first radiation part and a second radiation part, the first radiation part and the second radiation part of the first antenna are connected with each other to form an L-shaped structure, at least one of the first radiation part and the second radiation part of the first antenna is extended a distance beyond one of the side parts of the back cover, such that the at least one of the first radiation part and the second radiation part of the first antenna is not covered by the back cover and exposed to an outside of the communication device, and the at least one of the first radiation part and the second radiation part of the first antenna is located between the rim of the main body and one of the frame parts of the frame.

18. The antenna assembly of claim 17, wherein the back cover is made of a metal material.

* * * * *